United States Patent Office 3,634,386
Patented Jan. 11, 1972

3,634,386
PROCESS FOR CROSSLINKING GELATIN WITH HALOGENATED ORGANIC COMPOUNDS IN THE PRESENCE OF A BASIC TERTIARY AMINE
Walter Anderau, Cordast, Alfred Oetiker, Fribourg, and Werner Deuschel, Villars-sur-Glane, Switzerland, assignors to Ciba Limited, Basel, Switzerland
No Drawing. Filed Mar. 24, 1969, Ser. No. 809,968
Claims priority, application Switzerland, Mar. 26, 1968, 4,437/68
Int. Cl. C08h 7/06; C09h 7/00; G03c 1/30
U.S. Cl. 260—117
4 Claims

ABSTRACT OF THE DISCLOSURE

Hydrophilic colloids, especially gelatine containing water are crosslinked by means of organic crosslinking agents which contain at least one halogen atom capable of reacting with colloids. This process is carried out in the presence of a basic tertiary nitrogen compound, which accelerates the crosslinking, that means the same state of hardening is reached more rapidly or a higher state of hardening is reached in the same period of time through the action of the basic nitrogen compound than without it.

---

The subject of the invention is a process for crosslinking hydrophilic colloids, especially gelatine containing water, by means of organic crosslinking agents which contain at least one halogen atom capable of reacting with colloids. The process is characterised in that the crosslinking is carried out in the presence of a basic tertiary nitrogen compound.

The most diverse hydrophilic colloids can be crosslinked according to this process provided they are capable of reacting with the crosslinking agents containing halogen, that is to say provided they for example contain hydroxyl, sulphhydryl, amino or imino groups. As has been mentioned, the process is particularly suitable for crosslinking gelatine, but also gelatine derivatives, with gelatine for photographic purposes having to be mentioned above all. It is however also possible to crosslink other aqueous colloids such as polyvinyl alcohol or alkinates. Furthermore other natural or synthetic polymers capable of forming aqueous colloidal solutions, such as copolymers of acrylic acid, acrylamides, acrylonitrile, acrylic esters, acetic acid vinyl esters, vinylpyridine and/or vinylpyrrolidone as well as ethyleneimines may be added to the gelatine. Accordingly, such organic substances capable of reacting with the crosslinking agents containing halogen are to be used in the present process as are capable of forming colloidal solutions in an aqueous medium or are capable of swelling with absorption of water.

For the compounds used as crosslinking agents to be able to fulfill their purpose they should contain at least two reactive groups in the molecule, of which at least one possesses a halogen atom, preferably a chlorine or bromine atom. Compounds with halogen atoms which are located in an activated position of the molecule and are for example bonded to a carbon atom are therefore preferred. The crosslinking agents should be capable of reacting with the crosslinkable groups of the aqueous colloids in the temperature range of 10 to 80° C., especially of 20 to 60° C.

Crosslinking agents which can be used successfully are for example compounds which contain at least one 6-membered heterocyclic ring of aromatic character formed of 3 to 4 carbon atoms and 3 to 2 nitrogen atoms and at least one halogen atom bonded to a carbon atom of this ring, preferably at least two such halogen atoms, and optionally also further substituents. Compounds to be particularly mentioned here are halogeno-1,3,5-triazine compounds, halogenopyrimidine compounds, halogenoquinoxaline compounds and halogenoquinazoline compounds, especially the dihalogen compounds of formula (1) 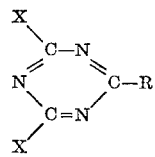

or compounds which for example possess a ring skeleton of formulae (2) 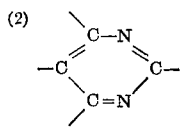   (3) 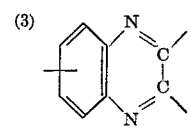

wherein X denotes a bromine atom or preferably a chlorine atom and R a hydrogen atom or an organic residue bonded to the heterocyclic ring by a carbon atom, oxygen atom, sulphur atom or nitrogen atom or a hydroxyl group or primary amino group bonded to the heterocyclic ring.

In general it is advisable to employ crosslinking agents which possess adequate solubility in water so that they can be brought together with the substances to be hardened in the form of aqueous solutions. Accordingly, the compounds of Formulae 1, 2 and 3 may contain acid groups which confer solubility in water such as carboxylic acid groups or especially sulphonic acid groups, which are preferably bonded to benzene or naphthalene residues. It should furthermore be noted that the residue R of these compounds can for example be an aliphatic, aromatic or heterocyclic residue, preferably an alkyl, cycloalkyl, benzene or naphthalene residue which is bonded to the heterocyclic residue directly or via an oxygen, sulphur or nitrogen atoms and which is unsubstituted or substituted by halogen atoms, alkyl groups such as methyl or ethyl, alkoxy groups such as methoxy or ethoxy, aryloxy groups such as phenoxy, aralkoxy such as phenylmethoxy, aralkyl groups such as benzyl, hydroxyl groups, carbalkoxy groups, alkenyl groups, secondary or tertiary amino groups or the acid groups conferring solubility in water which have already been mentioned.

Furthermore, crosslinking agents are suitable for the present process which contain at least one optionally unsaturated aliphatic hydrocarbon residue of at most 3 carbon atoms which is bonded via an oxygen or nitrogen atom or a methylene, carbonyl or sulphonyl group and which possesses at least one bromine atom or preferably chlorine atom bonded to the carbon atom in the α-position or β-position. This residue can, for example, especially when dealing with a hydrocarbon residue bonded via a carbonyl or sulphonyl group, by a halogenomethyl residue which is optionally substituted by a methyl group or by further halogen atoms, for example a chloracetyl group, or an appropriate halogenethyl residue such as —CO—CH$_2$—CH$_2$—Cl, —CO—CHCl—CH$_2$Cl or
—CO—CHBr—CH$_2$Br, or also an appropriate ethenyl residue such as —CO—CBr=CH$_2$. Further possibilities are also crosslinking agents of the nature indicated, which contain β-halogenethyl residues as hydrocarbon residues bonded via an oxygen atom or nitrogen atom, such as
—NH—CH$_2$—CH$_2$—Cl, —N(CH$_2$—CH$_2$—Cl)$_2$ or —O—CH$_2$—CH$_2$—Cl Numerous crosslinking agents containing halogen are in themselves known and others can be manufactured according to usual methods.

For example, the reaction products of halogenotriazines or halogenopyrimidines, preferably of the chlorine compounds such as cyanuric chloride, with aliphatic or aromatic amines, hydroxycarboxylic acids or carboxylic acids, with lower aliphatic alcohols, or with ammonia or water or also with gelatine itself are suitable for the present process. It is advantageous to choose such reaction products as still contain two reactive chlorine atoms on the triazine or pyrimidine ring. Compounds to be particularly mentioned those of formula (4) 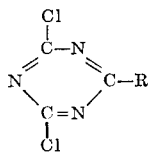

wherein R denotes one of the following residues:

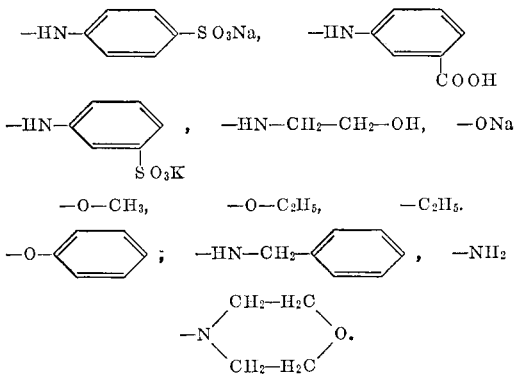

Further, 2,3-dichloroquinazoline-6-carboxylic acid chloride and reaction products of gelatine and cyanuric chloride or 2,4-dichloro-6-phenylamino-1,3,5-triazine-4′-sulphonic acid are suitable.

Further materials to be mentioned are crosslinking agents which contain at least one halogenovinyl group, for example compounds which contain at least one acid group conferring solubility in water and at least one $\alpha,\beta$-ethylenically unsaturated $\alpha$-halogenocarboxylic acid amide residue, for example the compound with two $\alpha$-bromacrylic residues of formula (5) 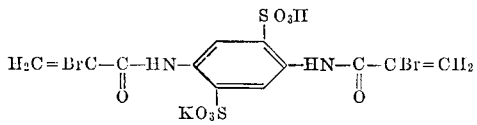

Further, compounds of formula (6) 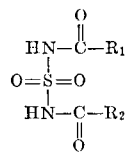

should be mentioned wherein $R_1$ and $R_2$ each denote a residue bonded by a hetero-atom (O, N) to the —CO— group and capable of reacting with compounds containing mobile hydrogen atoms with the formation of homopolar bonds, with at least one of the residues $R_1$ and $R_2$ possessing a reactive halogen atom, for example the compounds of formulae

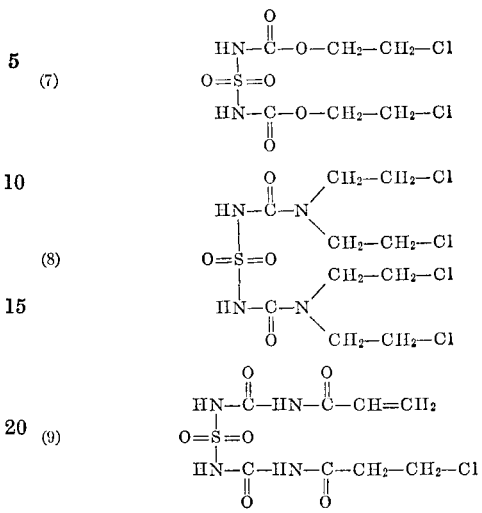

As compounds which contain $\alpha$-halogeno-methyl-carbonyl residues there may for example be mentioned: dibromdiacetyl and the reaction products of chloracetyl chloride, $\alpha,\beta$-dichloropropionic acid chloride or $\alpha,\beta$-dibromopropionic acid chloride with aliphatic and aromatic diamines. The reaction product can optionally also contain acid groups conferring solubility in water.

Reaction products of acylisocyanates, for example of chloracetyl isocyanate, with aminohydroxyalkanes, diaminoalkanes or dihydroxyalkanes are also possibilities. On the other hand, the reaction products of chloracetyl isocyanate with suitable reagents such as acrylic acid amide, glycidol, ethyleneimine, bis-$\beta$-chlorethylamine or $\beta$-chlorethanol as well as with polymers containing hydroxyl groups and amino groups are also suitable for the proposed process.

If instead of chloracetyl chloride or chloracetyl isocyanate $\beta$-chloropropionyl chloride or $\beta$-chloropropionyl isocyanate is used, entirely analogous products are obtained which, like similar compounds containing $\beta$-halogenethylcarbonyl residues, are suitable for the present process.

In particular, compounds of formula

(10) 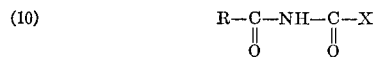

should be mentioned wherein R denotes the residue of composition $H_2CY—CH_2—$ or $H_2CY—HCY—$ (wherein Y represents a chlorine or bromine atom) and X denotes a residue bonded by a hetero-atom to the —CO— group and capable of reacting with compounds containing mobile hydrogen atoms, for example the compound of formula

(11) 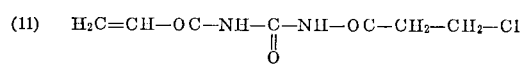

The individual reactive groups may occur once or several times in the molecule of the crosslinking agent. If this molecule only contains a single reactive halogen atom, then, as has already been mentioned, at least a second group capable of reacting with a colloid must be present, for example an acrylic, vinylsulphonyl, aldehyde, epoxy, ethyleneimine or anhydride group. Further, two or more than two different groups containing halogen may also be present. In general it suffices for a crosslinking agent to contain two reactive groupings. However, polymeric crosslinking agents can also be used in the present process.

As basic tertiary nitrogen compounds or also their salts which are required in the present process, such compounds can appropriately be used as possess at least one nitrogen atom which is bonded to alkyl or cycloalkyl residues or to an aralkyl or aryl residue, or to a further nitrogen atom which is optionally substituted by lower alkyl residues, or which belongs to a ring of aromatic character. Possible compounds are thus amines, alkylhydrazines and compounds containing ring nitrogen of the indicated kind. The basic nitrogen compound can for example contain a nitrogen atom which is bonded to two carbon atoms and which together with these forms a part of a ring of at least 5 members, for example of 5 or 6 members, which may also contain oxygen, sulphur or additional nitrogen atoms as further ring members. The basic nitrogen compounds may contain, as further substituents, alkyl groups such as methyl or ethyl, alkoxy groups such as methoxy or ethoxy, or amino or hydroxyl groups which are optionally substituted by alkyl groups, with the alkyl groups generally containing 1 to 5 carbon atoms. Compounds of formula

(12) 

are for example preferred, wherein $R_1$ and $R_2$ denote optionally further-substituted low molecular alkyl residues or cycloalkyl residues and $R_3$ denotes an optionally further-substituted low molecular alkyl residue or an amino group, and wherein $R_1$ and $R_2$ together with the nitrogen atom, or $R_1$, $R_2$ and $R_3$ together with the nitrogen atom, can form a heterocyclic ring system. Cyclic compounds of this nature for example correspond to the formula

(13) 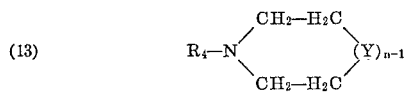

wherein $R_4$ denotes a hydrogen atom or a primary amino group or an amino group which is further-substituted by 1 to 2 low molecular alkyl groups, Y denotes —$CH_2$—, —O—, —NH— or alkyl —N— bridge and $n$ is equal to 1 to 2 low molecular alkyl groups, Y denotes —$CH_2$—, $n$ is 2 and Y is alkyl —N— bridge; 1,4-diazabicyclo-(2,2,2)-octane is exemplary thereof.

In detail, the following nitrogen compounds may be mentioned:

trimethylamine,
triethylamine,
N-ethyl-N-diisopropylamine,
dimethyl-dodecylamine,
diethyl-ethanolamine,
dimethyl-cyclohexylamine,
dimethylaniline,
N-ethylmorpholine,
p-dibenzylaminobenzaldehyde,
N-methyl-N-di-ethylamine,
1,5-diaza-bicyclo-(4.3.0)-5-nonene,
dodecahydro-1,4,7,9b-tetrazaphenalene,
1,4-diazabicyclo-(2.2.2)-octane,
N-methylpyrrolidine,
N-methylpiperazine,
N-methylmorpholine,
dimethylethanolamine,
N-methyl-N-ethyl-ethanolamine,
methyldiethanolamine,
pyridine,
α-picoline,
quinaldine,
N,N-dimethylhydrazine,
N,N-diethylhydrazine,
N,N-di-(β-hydroxyethyl)-hydrazine, as well as the following further hydrazine compounds:

N-aminopyrrolidone,
N-aminopiperazine, and
N-aminomorpholine.

The basic organic nitrogen compounds can accordingly contain not only one but also more than one nitrogen atom in the molecule. They do not have to be volatile and the boiling point of the nitrogen compounds under normal pressure can also be above 125° C. Even high molecular compounds are possibilities. The nitrogen compounds can be added to the aqueous colloid whilst dissolved in suitable solvents for example in water, in solvents which are miscible with water or in solvents which are immiscible with water. Where appropriate, the solution has to be brought to a finely dispersed uniform distibution in the colloid in a manner which is in itself known.

The use of diffusion-resistant amines, for example amines of high molecular weight or having very long alkyl chains, can also be advantageous for achieving a differentiated hardening effect in different layers. By this means a layer which is otherwise very slow and difficult to harden can rapidly be brought to the same state of hardening as an adjacent normally hardenable layer. This for example occurs when using certain emulsion additives, such as certain colour coupling agents or plasticisers.

In general it is however advantageous to add to the aqueous colloids, especially to the gelatine preparations intended for the formation of photographic materials, such nitrogen compounds as are at most slightly coloured and are sufficiently water-soluble that they do not visibly precipitate in the layer or crystallise. Lower alkylamines such as triethylamine, N-methylmorpholine, 1,4-diazabicyclo(2.2.2)-octane and also hydrazines such as for example N,N-dimethylhydrazine are for example particularly suitable for this. It is also possible to employ different nitrogen compounds in combination with one another for the same colloid.

The nitrogen compounds can also be employed in the form of their salts with acids, for example carboxylic acids having at most 6 carbon atoms such as oxalic acid and citric acid or inorganic acids such as hydrohalic acids, sulphuric acid and nitric acid. These salts may be added to the solution of the colloid in an isolated form or can be formed in solution by dissolving the tertiary amine and adding an appropriate amount of acid. Further possibilities are also nitrogen compounds which in addition to the tertiary nitrogen atom also additionally possess one or more quaternary nitrogen atoms and which are manufactured with the usual quaternising agents such as alkyl halides, for example methyl chloride or ethyl bromide; benzyl halides, for example benzyl chloride; ethylene halogenohydrins, epihalogenohydrins, for example epichlorhydrin, halogenacetamides, for example chloracetamide or cyanuric chlorides, for example 2,4-dimethoxy-6-chloro-s-triazine, or such as alkylsulphonates, for example dimethyl sulphate or diethyl sulphate or toluenesulphonic acid methyl or ethyl ester.

The basic nitrogen compounds and their salts can be employed with the crosslinking agent, in the same layer, or in an adjacent layer, under certain circumstances simultaneously or immediately subsequently. They can also only be applied later by re-moistening the material with a solution of the amine, for example by a dipping or spraying process or by steaming.

As regards the quantity ratio of the crosslinking agent and the basic nitrogen compound it must be stated that the use of stoichiometric amounts of amine is in no way necessary. On the contrary, it is in most cases advantageous to employ a significantly smaller amount of nitrogen compound than the amount equivalent to the particular quantity of the crosslinking agent containing halogen. Thus the amount of the organic nitrogen compound can for example be at most 20% by weight and preferably 0.05 to 10% by weight of the amount of the crosslinking agent. The result is generally not influenced by whether the basic nitrogen compound is first applied to the colloid, followed by the crosslinking agent, or whether the reverse procedure is followed.

The present process is particularly well suited for crosslinking under acid to at most weakly alkaline conditions, for example in such a way that the pH value of the aqueous colloid is at most 7.5, for example at most 6, during the crosslinking.

As has already been indicated, there are various possibilities for carrying out the process, of which some particularly important ones are circumscribed below:

(1) The crosslinking agent and the nitrogen compound are simultaneously supplied to the aqueous colloid.

(2) The crosslinking agent is first supplied to the aqueous colloid, followed by the nitrogen compound.

(3) The nitrogen compound is first supplied to the aqueous colloid, followed by the crosslinking agent.

(4) The procedure of 2 is followed, with the nitrogen compound only being supplied to the aqueous colloid immediately before the layer is manufactured.

(5) The procedure of 3 is followed, with the crosslinking agent only being supplied to the aqueous colloid immediately before the manufacture of the layer.

(6) The procedure of 2 is followed, with the nitrogen compound being supplied to the layer of the aqueous colloid containing the crosslinking agent.

(7) The procedure of 3 is followed, with the crosslinking agent being supplied to the layer of the aqueous colloid which contains the nitrogen compound.

(8) The crosslinking is effected in multi-layer materials, with the crosslinking agent and the nitrogen compound initially being present in different layers.

Thus the effect of accelerating the crosslinking, achieved in the present process, can be realised in very different ways. According to 2 and 3 the aqueous colloid can first be left to stand for some minutes up to several hours with one of the two additives, for example with the nitrogen compound which is by itself inactive, and it is possible only to add the other additive when the actual initiation of the crosslinking process is desired immediately afterwards. It is also possible for both substances only to be added at this point in time according to 1, either all at once, for example to the colloid in the supply vessel, or continuously, for example into the stream of the out-flowing colloid preparation, with carefully selected metering. Such metering, for example in the inflow of a casting dish or of a metering casting device, as described in U.S.A. patent specification 2,761,418, can be very useful for the manufacture of photographic materials. According to 8, it is possible when manufacturing materials of several layers first to apply a layer with the crosslinking agent and then the superimposed layer with the nitrogen compound, or to apply the two layers simultaneously; here it is important that at least one of the two substances can diffuse within the layer laminate. It is of course also possible to follow the reverse procedure, that is to say first to cast the layer with the nitrogen compound and then the layer with the crosslinking agent.

It is furthermore possible to produce crosslinking effects intrinsic to a layer, for example to harden one layer more than the other, if one of the two substances is resistant to diffusion. Both substances can also, before being brought together, be separately present in two different colloid preparations, and then be cast together at the desired point in time. The crosslinking agents and the nitrogen compounds may be added to the colloid in the solid state or as a solution. It is also possible to effect a gas treatment of layers which have already been spread with volatile nitrogen bases such as trimethylamine. In all cases attention must however be paid to adequate distribution of both substances in the colloid. This can already be largely ensured by adequate solubility in water.

As has been mentioned, it is advantageous to employ relatively small quantities of nitrogen compound so that at the time of the addition there is no significant, or at least no harmful, change in the temperature, the viscosity, the concentration and especially the pH value. Only the crosslinking reaction itself should lead to such changes.

By the combined use of basic nitrogen compounds and crosslinking agents a significant acceleration of hardening is achieved over a wide pH range, in general from 3.5 to 11, especially from 4 to 7.5. At the same time the hardening-accelerating action is largely dependent on the prevailing pH-value of the colloid medium. The pH-value can thus be suited to the requirements of the particular photographic system in question without having to fear that the hardening process will be impaired. For practical purposes, the advantage of the present process above all resides in the fact that when using cross-linking agents of the indicated type, the same state of hardening is reached more rapidly or a higher state of hardening is reached in the same time through the action of the basic nitrogen compound, without at the same time having to accept disadvantages in processing or in the properties of the material.

EXAMPLE 1

A 6% strength gelatine solution in water is manufactured in the usual manner at 40° C., as is a 1% strength solution of the sodium salt of 2,4-dichloro-6-phenyl-amino-1,3,5-trazine-4'-sulphonic acid (crosslinking agent, hardener) and a 1% strength solution of 1,4-diaza-bicyclo (2,2,2)-octane(amine) in water at 25° C.

100 ml. of a 6% strength gelatine solution are mixed, in the indicated sequence, with 20 ml. of the 1% strength hardener solution and 0 to 2 ml. of the solution of the diaza-bicyclo-octane at 40° C., 10 ml. thereof are cast on a 13 cm. 18 cm. substrated glass plate, and allowed to dry for 2 hours at 32° C., and the glass plate is stored for a further 24 hours at 20 to 22° C. and 50 to 55% atmospheric humidity. The original solution is kept at 40° C. until it has solidified to lumps and can no longer be stirred with a glass rod. This point is to be described as "solid." In one case the pH-value was set to 6 with 0.4 g. of citric acid.

The melting points are determined by dipping into a water-bath agitated by stirring, with gradual heating from room temperature to the boiling point. The temperature at which the gelatine layer detaches from the substrate by dissolution is taken as the melting point.

The results of a crosslinking effected in this way are recorded in Table I.

TABLE 1

| No. | Amine solution ml. | Solution consistency | Casting melting point in ° C. after 24 hours |
|---|---|---|---|
| 1.1 | 0 | Liquid after 24 hours | 85 |
| 1.2 | 0.5 | Solid after 80 minutes | >95 |
| 1.3 | 1 | Solid after 40 minutes | >95 |
| 1.4 | 2 | Solid after 15 minutes | >95 |
| 1.5 | ¹ 2 | Solid after 60 minutes | >95 |

¹ Plus 0.4 g. of citric acid. pH 6.

EXAMPLE 2

6% strength gelatine solution and 1% strength hardener solution, manufactured in the same manner as in Example 1, are used; additionally, an 0.05% strength solution of diaza-bicyclo-octane (amine) in water, manufactured analogously to Example 1.

First, 33 ml. of 6% strength gelatine solution and 10 ml. 1% strength hardener solution are mixed at 40° C., and 0 to 20 ml. of the 0.05% strength amine solution are then added. The mixture is then made up to 100 ml. with water. Such a solution contains 5 g. of hardener per 100 g. of gelatine, and 0 to 10 g. of amine per 100 g. of hardener. Immediately after addition of the amine solution 10 ml. are cast on a glass plate, dried and the melting point determined, as described in Example 1.

The remaining solution is kept at 40° C. and the pH-value is determined at the beginning, after 2 hours and after 18 hours in the usual manner. The results obtained are recorded in Table II.

TABLE II

| No. | Amine solution ml. | Solution pH after 0 hours | Solution pH after 2 hours | Solution pH after 18 hours | Melting point in ° C. after 2 hours | Melting point in ° C. after 18 hours |
|---|---|---|---|---|---|---|
| 2.1 | 0 | 4.8 | 4.7 | 4.4 | 42 | >95 |
| 2.2 | 1.25 | 4.8 | 4.6 | 4.3 | 80 | >95 |
| 2.3 | 2.5 | 4.8 | 4.6 | 4.3 | 90 | >95 |
| 2.4 | 5.0 | 4.8 | 4.4 | 4.2 | 95 | >95 |
| 2.5 | 10.0 | 4.8 | 4.3 | 4.2 | >95 | >95 |
| 2.6 | 20.0 | 4.8 | 4.2 | 4.2 | >95 | >95 |

EXAMPLE 3

The same solutions and the same process as in Example 2 are used.

5 ml. of 1% strength hardener solution and 0 to 5 ml. of amine solution are used per 33 ml. of 6% strength gelatine solution.

Results: See Table III.

TABLE III

| No. | Amine solution ml. | Solution pH after 0 hours | Solution pH after 2 hours | Casting melting point in ° C. after 2 hours |
|---|---|---|---|---|
| 3.1 | 0 | 5.1 | 5.0 | 35 |
| 3.2 | 0.3025 | 5.1 | 4.9 | 36 |
| 3.3 | 1.25 | 5.1 | 4.8 | 60 |
| 3.4 | 5.0 | 5.1 | 4.8 | 95 |

EXAMPLE 4

The same solutions and the same process as in Example 2 are used.

10 ml. of hardener solution and 5 ml. of amine solution are used per 33 ml. of gelatine solution.

The pH is adjusted with 10% strength aqueous citric acid solution immediately after adding the amine solution.

Results: See Table IV.

TABLE IV

| No. | 1% strength hardener solution ml. | 0.05% strength amine solution ml. | Solution pH after 0 hrs. | Solution pH after 2 hrs. | Casting melting point in ° C. after 2 hrs. | Casting melting point in ° C. after 4 hrs. | Casting melting point in ° C. after 20 hrs. |
|---|---|---|---|---|---|---|---|
| 4.1 | 10 | 0 | 4.0 | 4.0 | 32 | 34 | 35 |
| 4.2 | 10 | 5 | 4.0 | 3.9 | 36 | 39 | 69 |
| 4.3 | 10 | 5 | 4.25 | 4.1 | 80 | 95 | >95 |
| 4.4 | 10 | 5 | 4.5 | 4.2 | 85 | 95 | >95 |

EXAMPLE 5

The same solutions and the same process as in Example 4 are used.

5 ml. of hardener solution and 1.25 ml. of amine solution are used per 33 ml. of gelatine solution.

The pH is furthermore adjusted with 2 N sodium hydroxide solution.

Results: See Table V.

TABLE V

| No. | 1% strength hardener solution ml. | 0.05% strength amine solution ml. | Solution pH after 0 hrs. | Solution pH after 2 hrs. | Casting melting point in ° C. after 2 hrs. | Casting melting point in ° C. after 20 hrs. |
|---|---|---|---|---|---|---|
| 5.1 | 5 | 1.25 | 4.0 | 4.1 | 34 | 38 |
| 5.2 | 5 | 1.25 | 4.5 | -------- | 40 | from 45 |
| 5.3 | 5 | 1.25 | 5.0 | 5.0 | 85 | >95 |
| 5.4 | 5 | 1.25 | 6.2 | 5.6 | >85 | >95 |
| 5.5 | 5 | 1.25 | 7.0 | 5.9 | >85 | >95 |
| 5.6 | 10 | 0 | 6.9 | -------- | 39 | -------- |

EXAMPLE 6

The same solutions and the same process as in Example 2 are used.

10 ml. of hardener solution and 0 to 0.625 ml. of amine solution are used per 33 ml. of gelatine solution.

Results: See Table VI.

TABLE VI

| No. | 1% strength hardener solution | 0.05% strength amine solution | Casting melting point in ° C. after 4 hours |
|---|---|---|---|
| 6.1 | 10 | 0 | 85 |
| 6.2 | 10 | 0.156 | 94 |
| 6.3 | 10 | 0.312 | >95 |
| 6.4 | 10 | 0.625 | >95 |

EXAMPLE 7

Using 10 ml. of 1% strength hardener solution and 10 ml. of 0.05% strength amine solution the following results are obtained entirely analogously to Examples 1 to 6.

TABLE VII

| No. | Amine solution | Melting point in ° C. after 2 hours | Melting point in ° C. after 4 hours |
|---|---|---|---|
| 7.1 | None | 35 | 78 |
| 7.2 | Diethyl-ethanolamine | 45 | 95 |
| 7.3 | Dimethyl-cyclohexylamine | 64 | 93 |
| 7.4 | Ethyl-diisopropylamine | 39 | 90 |
| 7.5 | Dimethylaniline | 38 | 90 |
| 7.6 | N-Ethylmorpholine | 38 | 95 |
| 7.7 | Dodecahydro-1,4,7,9b-tetrazaphenalene | 42 | 90 |
| 7.8 | Pyridine | 50 | 91 |
| 7.9 | N,N-Dimethyl-hydrazine | 90 | 90 |

EXAMPLE 8

20 ml. of a 1% strength solution of the compound of formula (8.1)

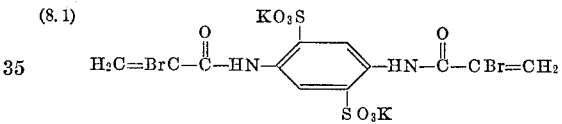

in water and 40 ml. of an 0.05% strength solution of 1,4-diaza-bicyclo(2,2,2)-octane in water are added to 33 ml. of 6% strength gelatine solution at 40° C. and the mixture is made up to 100 ml. with water. 10 ml. are cast on a glass plate as described in Example 2, dried and stored for 5 days at room temperature. The melting point of the gelatine is 73° C. A comparison specimen without amine solution melts at 38° C.

EXAMPLE 9

Either 5 ml. of a 2% strength hardener solution quoted below or 10 ml. of a 1% strength hardener solution are added to 33 ml. of 6% strength gelatine solution at 40° C., 20 ml. of 0.05% strength 1,4-diaza-bicyclo-(2,2,2)-octane solution are added and the pH-value is adjusted to 7.5–7.8, by means of 2 N sodium hydroxide solution. In order to follow the reaction of the hardeners, the change in the pH-value over the course of the first 2 hours is determined whilst keeping the gelatine solutions at 40° C., similarly to the description in Example 2.

Hardener Solutions 9.1  $H_2C=HC-C-HN-C-NH-C-CH_2-CH_2-Cl$
            $\|$    $\|$   $\|$
            $O$    $O$   $O$ 1% in ethanol 9.2  $CH_2-O-CO-NH-CO-CH_2-CH_2-Cl$
     $|$
     $CH-O-CO-NH-CO-CH_2-CH_2-Cl$
     $|$
     $CH_2-O-CO-NH-CO-CH_2-CH_2-Cl$   1% in ethanol 9.3  $H_2C\overset{O}{\diagup\diagdown}CH-H_2C-O-\overset{O}{\underset{\|}{C}}-NH-\overset{O}{\underset{\|}{C}}-CH_2-CH_2-Cl$  2% in ethanol

TABLE VIII

| Hardener solution | Amine solution | pH at the beginning | pH at the end | Difference |
|---|---|---|---|---|
| 9.1 | With | 7.7 | 6.1 | −1.6 |
| 9.1 | Without | 7.5 | 6.2 | −1.3 |
| 9.2 | With | 7.7 | 6.5 | −1.2 |
| 9.2 | Without | 7.7 | 6.7 | −1.0 |
| 9.3 | With | 7.8 | 6.9 | −0.9 |
| 9.3 | Without | 7.5 | 6.8 | −0.7 |

EXAMPLE 10

5 ml. of a 1% strength solution of the hardener specified above and 10 ml. of an 0.05% strength solution of 1,4-diaza-bicyclo-(2,2,2)-octane in water are added to 33 ml. of 6% strength gelatine solution as described in Example 8 and in other respects the procedure specified there is followed, comparing with a corresponding solution without the tertiary amine.

10.1

[structure: 2,4-dichloro-6-phenoxy-1,3,5-triazine] 1% in ethanol 10.2

[structure: 2,4-dichloro-6-methoxy-1,3,5-triazine] 1% in ethanol 10.3

[structure: 2,4-dichloro-6-(carboxyphenylamino)-1,3,5-triazine] 1% in water with the addition of sufficient 2 N NaOH for the carboxylic acid to dissolve.

10.4  BrH₂C—C—C—CH₂Br   1% in menthanol
           ‖   ‖
           O   O

TABLE IX

| Hardener solution | Amine solution | Melting point in ° C. |
|---|---|---|
| 10.1 | With | 56 after 5 hours.[1] |
| 10.1 | Without | 35 after 5 hours.[2] |
| 10.2 | With | >95 after 3 hours. |
| 10.2 | Without | 34 after 3 hours. |
| 10.3 | With | >95 after 3 hours. |
| 10.3 | Without | 34 after 3 hours. |
| 10.4 | With | 66 after 5 hours. |
| 10.4 | Without | 62 after 5 hours. |

[1] 86 after 20 hours.
[2] 36 after 20 hours.

EXAMPLE 11

1.0 ml. of a 1% strength solution of the compound of formula 11.1   H₂C=CH—OC—HN—C(=O)—NH—OC—CH₂—CH₂—Cl in ethanol and 1.0 ml. of an 0.05% strength aqueous solution of 1,4-diaza-bicyclo-(2.2.2)-octane are added at 40° c. to 3.3 ml. of a 6% strength gelatine solution and the mixture is made up to 10 ml. of with water. It is cast on a glass plate as described in Example 2 and the procedure described there is followed in other respects. After 15 hours' drying a melting point of 86° C. is determined, whilst a corresponding sample without 1,4-diazo-bicyclo-(2,2,2)-octane melts at 37° C. after this time.

EXAMPLE 12

A red sensitizer and the usual casting additives such as stabiliser, wetting agent, but no hardener as well as the cyan image dyestuff of formula (12.1)
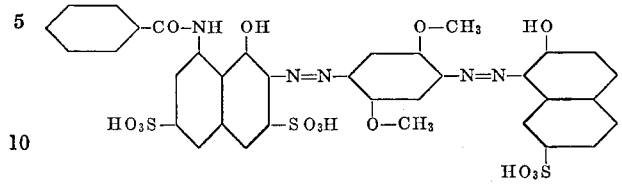

are added in a known manner, at 40° C., to 1 kg. of a highly sensitive silver bromide-iodide emulsion containing 7% of gelatine. 50 ml. of a 0.5% strength aqueous 1,4-diazabicyclo-(2,2,2)-octane solution (amine) adjusted to pH 6.5 with citric acid are also stirred into the mixture. Thereafter the mixture is filtered and the viscosity is adjusted to the desired value by adding the requisite amount of water. The pH-value in the ready-to-cast mixture is also 6.5. A 6μ thick layer (in the dry state) is produced on a photographic layer support at a casting temperature of 40° C. and a casting speed of 6 m./minute.

A colourless gelatine layer of 2μ thickness (in the dry state) is cast over this layer in the usual manner. This layer contains, relative to dry gelatine, 5.9% of sodium 2,4-dichloro-6-phenylamino-1,3,5-triazine-4'-sulphonate as the cross-linking agent (hardener). The pH-value in the ready-to-cast mixture is 6.0.

For comparison purposes, a corresponding two-layer system is manufactured, which only differs from the one which has been described in that it does not contain any amine as the hardening accelerator in the emulsion layer.

Analogous materials are manufactured with green-sensitive layers, with a green sensitiser and with the purple image dyestuff of formula (12.3)
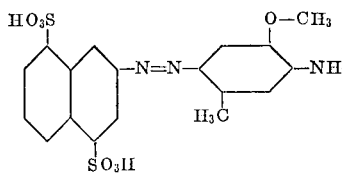

and also with blue-sensitive layers, unsensitised, and with the yellow image dyestuff of formula (12.4)
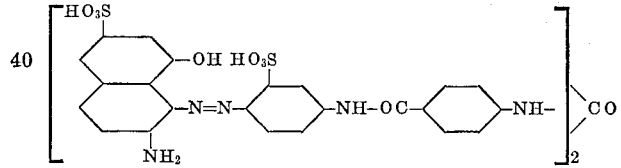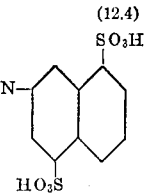

After a storage time of 4 hours at room climatic conditions of 20° C. and 55% relative humidity the melting points in water are determined. The following values are obtained:

TABLE X

| | Cyan | Magenta | Yellow |
|---|---|---|---|
| Without accelerator | 50° C. | 45° C. | 47° C. |
| With accelerator | >80° C. | >80° C. | >80° C. |

EXAMPLE 13

6 ml. at a time of a 6% strength gelatine solution manufactured in the usual manner are mixed at 40° C. with 2 ml. at a time of a 1% strength aqueous solution of the 2,4-dichloro-6-phenylamino-1,3,5-triazine-4'-sulphonic acid sodium salt (hardener) and 0.25 ml. of an 0.02 N aqueous solution of compounds 13.1 to 13.5, and the resulting mixture diluted with 2 ml. at a time of water and cast on a 13 cm. x 18 cm. substrated glass plate in the usual manner. The plates manufactured in this way are subsequently dried for 2 hours at 36° C. and the melting point is determined as specified in Example 1.

Table XI

TABLE XI

| No. | Formula | | Melting point of the layer in ° C. after 2 hours |
|---|---|---|---|
| 13.1 | [pyridinium ring with N-H] | Cl⁻ | >95 |
| 13.2 | | Br⁻ | >95 |
| 13.3 | | CH₃COO⁻ | >95 |
| 13.4 | | ½ SO₄⁻⁻ | >95 |
| 13.5 | | ½ C₂O₄⁻⁻ | >95 |

An otherwise identical layer without ammonium salt had a melting point of 72° C. under the same conditions after 2 hours.

EXAMPLE 14

6 ml. of a gelatine solution manufactured in the usual manner are mixed at 40° C. with 2 ml. of a 1% strength aqueous solution of compound 10.2, 0.5 ml. of an 0.02 N aqueous solution of compound 13.1 and 1.5 ml. of water and cast on a 13 cm. x 18 cm. substrated glass plate. After a drying time of 2 hours at 36° C. the melting point of the layer has risen to above 95° C.

EXAMPLE 15

1.5 ml. at a time of a 2% strength solution of the hardener from Example 1 and 0.3 (15.1), or 0.75 ml. (15.2), respectively, of an 0.02 N aqueous solution of 1,4 - diaza - bicyclo - (2,2,2) - octane are added to 10 gram at a time of a 6% strength aqueous solution of polyvinyl alcohol. The mixture manufactured in this way is diluted with water up to a total weight of 15 grams, cast on a 13 cm. x 18 cm. substrated glass plate in the usual manner, and dried for 2 hours at 36° C. The melting points are determined as in Example 1. They are 58° C. in the case of 15.1 and 55° C. in the case of 15.2.

A layer manufactured in the same manner without addition of amine has a melting point of 34° C.

EXAMPLE 16

6 ml. at a time of a 6% strength gelatine solution manufactured in the usual manner are mixed at 40° C. with 2 ml. at a time of a 1% strength aqueous solution of 2,4 - dichloro - 6 - phenylamino - 1,3,5 - triazine-4'-sulphonic acid sodium salt (crosslinking agent), 2 ml. at a time of water and 0.25 ml. of a 0.02 N aqueous solution of compounds 16.1 to 16.4. The mixtures thus obtained are subsequently cast on a 13 cm. x 18 cm. substrated glass plate in the usual manner and the plates manufactured in this way are dried for 2 hours at 36° C.

The melting points are determined as specified in Example 1. The results are summarised in Table XII.

TABLE XII

| No. | Formula | Melting point of the layer in ° C. after 2 hours |
|---|---|---|
| 16.1 | [N⟨⟩N⁺—CH₃] Cl⁻ | >95 |
| 16.2 | [N⟨⟩N⁺—CH₂—CH₃] Br⁻ | >95 |
| 16.3 | [N⟨⟩N⁺—CH₂—⟨⟩] Cl⁻ | >95 |
| 16.4 | [N⟨⟩N⁺—(triazine with OCH₃, OCH₃)] Cl⁻ | >95 |

An identical layer without ammonium compound had a melting point of 72° C., under otherwise identical conditions.

EXAMPLE 17

6 ml. at a time of a 6% strength gelatine solution manufactured in the usual manner are mixed at 40° C. with 2 ml. at a time of a 1% strength solution of 2,4 - dichloro - 6 - methoxy - 1,3,5 - triazine (crosslinking agent), 2 ml. of water at a time and 0.5 ml. of an 0.02 N aqueous solution of compounds 16.1 and 16.3. The mixtures thus obtained are subsequently cast on a 13 cm. x 18 cm. substrated glass plate in the usual manner and the plates manufactured in this way are dried for 2 hours at 36° C. The melting points were determined as in Example 1. They are above 95° C. in both cases.

An identical layer without ammonium compound has a melting point of 72° C. under otherwise identical conditions.

EXAMPLE 18

6 ml. at a time of a 6% strength gelatine solution manufactured in the usual manner are treated at 40° C. with 2 ml. at a time of the hardener solution from Example 16 and 0.3 to 2.0 ml. of an 0.004 N solution of compound 16.2 or 16.3, and made up to 10 ml. with water. The mixtures thus obtained are subsequently cast on 13 cm. x 18 cm. substrated glass plates and the plates manufactured in this way are dried for 2 hours at 36° C. After this time the melting points are determined as specified in Example 1. They are above 95° C. in all cases.

An identical layer without ammonium compound has a melting point of 72° C. under otherwise identical conditions.

EXAMPLE 19

6 ml. at a time of a 6% strength gelatine solution manufactured in the usual manner are adjusted to the desired pH-value at 40° C. by adding 10% strength citric acid solution or 1 N NaOH; 2 ml. at a time of hardener solution from Example 16 and 0.2 ml. of an 0.02 N aqueous solution of compounds 16.1 and 16.3 are added and the mixture diluted to a total volume of 10 ml. with water. After 3 minutes the pH-values of the solutions are determined at 40° C. in the usual manner, the solutions are then cast on 13 cm. x 18 cm. substrated glass plates, the plates dried for 2 hours at 36° C. and the melting points thereafter determined as in Example 1. The results are summarised in Table XIII.

TABLE XIII

| Addition of compound No. | pH-value | Melting point after 2 hours, in ° C. |
|---|---|---|
| No addition | 4.5 | 37–42 |
| | 5.4 | 39–41 |
| | 6.3 | 70 |
| | 6.5 | 52 |
| 16.1 | 4.6 | 90–95 |
| | 5.3 | >95 |
| | 5.9 | >95 |
| | 6.1 | >95 |
| | 6.6 | >95 |
| 16.3 | 4.6 | 82 |
| | 5.4 | 85 |
| | 5.8 | >95 |
| | 6.1 | >95 |

EXAMPLE 20

10 grams at a time of a 6% strength aqueous polyvinyl alcohol solution are mixed with 1.5 ml. of a 2% strength aqueous solution of the hardener from Example 16 and 0.3 to 1.5 ml. of an 0.02 N solution of compound 16.1 or 16.3. The resulting mixtures are diluted with water up to a total weight of 15 grams and cast on 13 cm. x 18 cm. substrated glass plates. After a drying time of 2 hours at 36° C. the melting points are determined as described in Example 1. The results are summarised in Table XIV.

TABLE XIV

| Compound No. | Mol 10² of accelerator per 100 g. of hardener | Melting point in ° C. after 2 hours. |
|---|---|---|
| 16.1 | 2.0 | 52 |
| 16.3 | 2.0 | 62 |
|  | 5.0 | 70 |
|  | 10.0 | 70 |

A corresponding layer without accelerator had a melting point of 34° C. under the same conditions.

What is claimed is:

1. A process for cross-linking gelatin which comprises reacting with the gelatin
   (a) as a cross-linking agent a compound containing at least one 6-membered heterocyclic ring of aromatic character formed of 3 to 4 carbon atoms and 3 to 2 nitrogen atoms and at least one halogen atom bonded to a carbon atom of this ring in the presence of
   (b) a basic tertiary nitrogen compound selected from the group consisting of
   (b') a compound of the formula

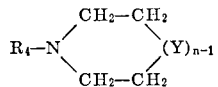

wherein $R_4$ represents a member selected from the group consisting of a hydrogen atom, a primary amino group, an amino group which is substituted by one low molecular radical and an amino group which is substituted by two low molecular alkyl groups, Y represents a member selected from the group consisting of a —$CH_2$—, —O—, —NH— and alkyl-N-bridge, and $n$ is one or two, $R_4$ additionally being part of a bridging group where $n=2$ and Y is alkyl-N-bridge, and
   (b") N,N-dimethyl hydrazine.

2. Process according to claim 1, which comprises using (a) as crosslinking agents, compounds of the formula

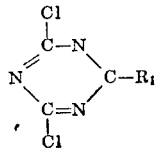

wherein $R_1$ represents a member selected from the group consisting of an alkyl, cycloalkyl, benzene and naphthalene radical which is unsubstituted or substituted by members selected from the group consisting of a halogen atom an alkyl, alkoxy, aryloxy, aralkoxy, aralkyl, hydroxyl, carbalkoxy, alkenyl secondary amino, tertiary amino, carboxylic acid and sulfonic acid group and which is bonded to the triazine ring either directly or via a member selected from the group consisting of an oxygen, sulfur and nitrogen atom and sulfonyl group, and (b) as basic tertiary nitrogen compound, the 1,4-diazabicyclo-(2,2,2)-octane of the formula

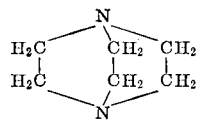

3. A process according to claim 1 which comprises using
   (a) as crosslinking agent a member selected from the group consisting of a compound of the formula

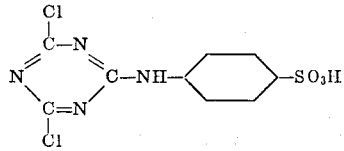

and

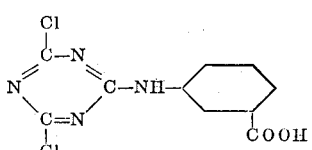

and

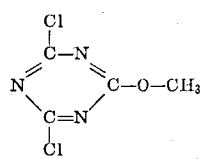

and
   (b) as basic tertiary nitrogen compound, the 1,4-diazabicyclo-(2,2,2)-octane of the formula

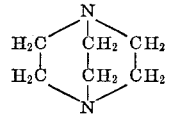

4. A process according to claim 1 which comprises using
   (a) as a crosslinking agent 2,4 - dichloro-6-phenylamino-1,3,5-triazine-4'-sulfonic acid and
   (b) as a basic tertiary nitrogen compound 1,4-diazabicyclo-(2,2,2)-octane.

References Cited

UNITED STATES PATENTS

| 2,080,019 | 5/1937 | White | 96—111 |
| 2,398,317 | 4/1946 | Mackenzie et al. | 260—117 X |
| 2,983,611 | 5/1961 | Allen et al. | 96—111 |
| 3,220,848 | 11/1965 | Himmelman et al. | 96—111 |
| 3,288,775 | 11/1966 | Anderau et al. | 260—117 |

HOWARD E. SCHAIN, Primary Examiner

U.S. Cl. X.R.

96—111